(12) United States Patent
Cheatham, III et al.

(10) Patent No.: US 9,810,819 B2
(45) Date of Patent: Nov. 7, 2017

(54) CAMOUFLAGE FOR TRANSMISSION TOWERS AND LINES

(71) Applicant: Elwha LLC, Bellevue, WA (US)

(72) Inventors: Jesse R. Cheatham, III, Seattle, WA (US); Geoffrey F. Deane, Bellevue, WA (US); William Gates, Medina, WA (US); Roderick A. Hyde, Redmond, WA (US); Muriel Y. Ishikawa, Livermore, CA (US); Jordin T. Kare, Seattle, WA (US); Nathan P. Myhrvold, Medina, WA (US); Robert C. Petroski, Seattle, WA (US); Clarence T. Tegreene, Mercer Island, WA (US); David B. Tuckerman, Lafayette, CA (US); Charles Whitmer, North Bend, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 96 days.

(21) Appl. No.: 14/597,803

(22) Filed: Jan. 15, 2015

(65) Prior Publication Data

US 2016/0209557 A1    Jul. 21, 2016

(51) Int. Cl.
| | |
|---|---|
| *G02B 5/08* | (2006.01) |
| *F41H 3/00* | (2006.01) |
| *B44F 1/02* | (2006.01) |
| *H02G 7/00* | (2006.01) |

(52) U.S. Cl.
CPC ............... *G02B 5/08* (2013.01); *B44F 1/02* (2013.01); *F41H 3/00* (2013.01); *H02G 7/00* (2013.01)

(58) Field of Classification Search
None
See application file for complete search history.

(56) References Cited

U.S. PATENT DOCUMENTS

| | | | |
|---|---|---|---|
| 4,212,440 A * | 7/1980 | Ferris | F41H 3/00 244/1 R |
| 4,288,974 A | 9/1981 | Eistrat | |
| 6,408,865 B1 * | 6/2002 | Bliss | A01M 31/025 135/117 |
| 7,132,635 B2 | 11/2006 | Dowling | |

(Continued)

OTHER PUBLICATIONS

Forskningsradet, "Optimal Design and Routing of Power Lines; Ecological, Technical and Economic Perspectives", http://www.forskningsradet.no/servlet/Satellite?c=Prosjekt&cid=1232110434936&pagename=renergi/Hovedsidemal&p=1226993846917, Dec. 31, 2013, visited Jan. 16, 2015, 1 pg.

(Continued)

*Primary Examiner* — Laura Powers

(57) ABSTRACT

The present disclosure relates to camouflaged systems and related camouflaging methods. The camouflaged systems can include at least one camouflaged object, including but not limited to transmission lines and transmission towers. One or more surfaces of the camouflaged object can be configured to appear like (e.g., match, mimic, simulate, correspond to, or otherwise blend with) an environmental condition, which can include any variety of background environmental landscapes. For example, one or more surfaces of the camouflaged object can be painted, coated, or imparted with a texture such that they reflect light in a way that corresponds to any particular environmental condition.

27 Claims, 8 Drawing Sheets

(56) References Cited

U.S. PATENT DOCUMENTS

| | | | |
|---|---|---|---|
| 2004/0036006 A1 | 2/2004 | Dowling | |
| 2008/0246679 A1* | 10/2008 | Martek | H01Q 1/362 |
| | | | 343/793 |
| 2008/0261002 A1* | 10/2008 | Sloot | F41H 3/00 |
| | | | 428/198 |
| 2013/0284512 A1* | 10/2013 | Fulk | H02G 7/20 |
| | | | 174/45 R |
| 2014/0105745 A1* | 4/2014 | Pokotylo | F03D 11/00 |
| | | | 416/146 R |

OTHER PUBLICATIONS

Goulty, "Camouflage Painting of Steel Lattice Transmission Towers, With Particular Reference to England and Wales", Landscape and Urban Planning, 1987, pp. 345-354, issue 14, Elsevier Science Publishers B.V., Amsterdam, The Netherlands.

\* cited by examiner

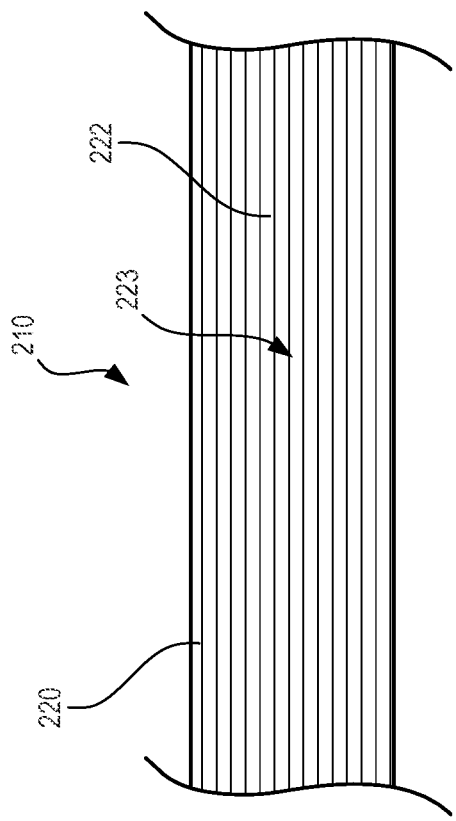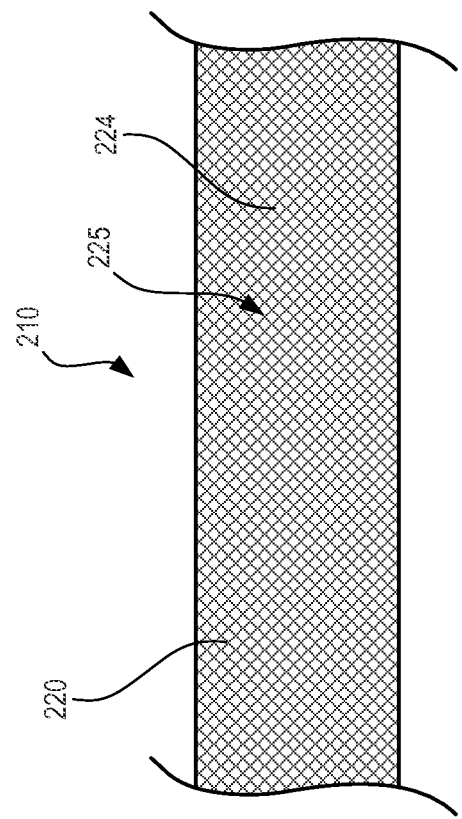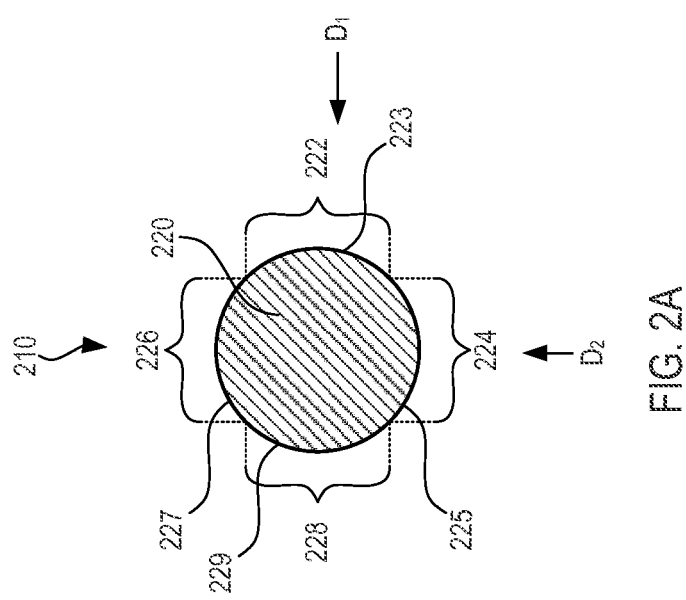

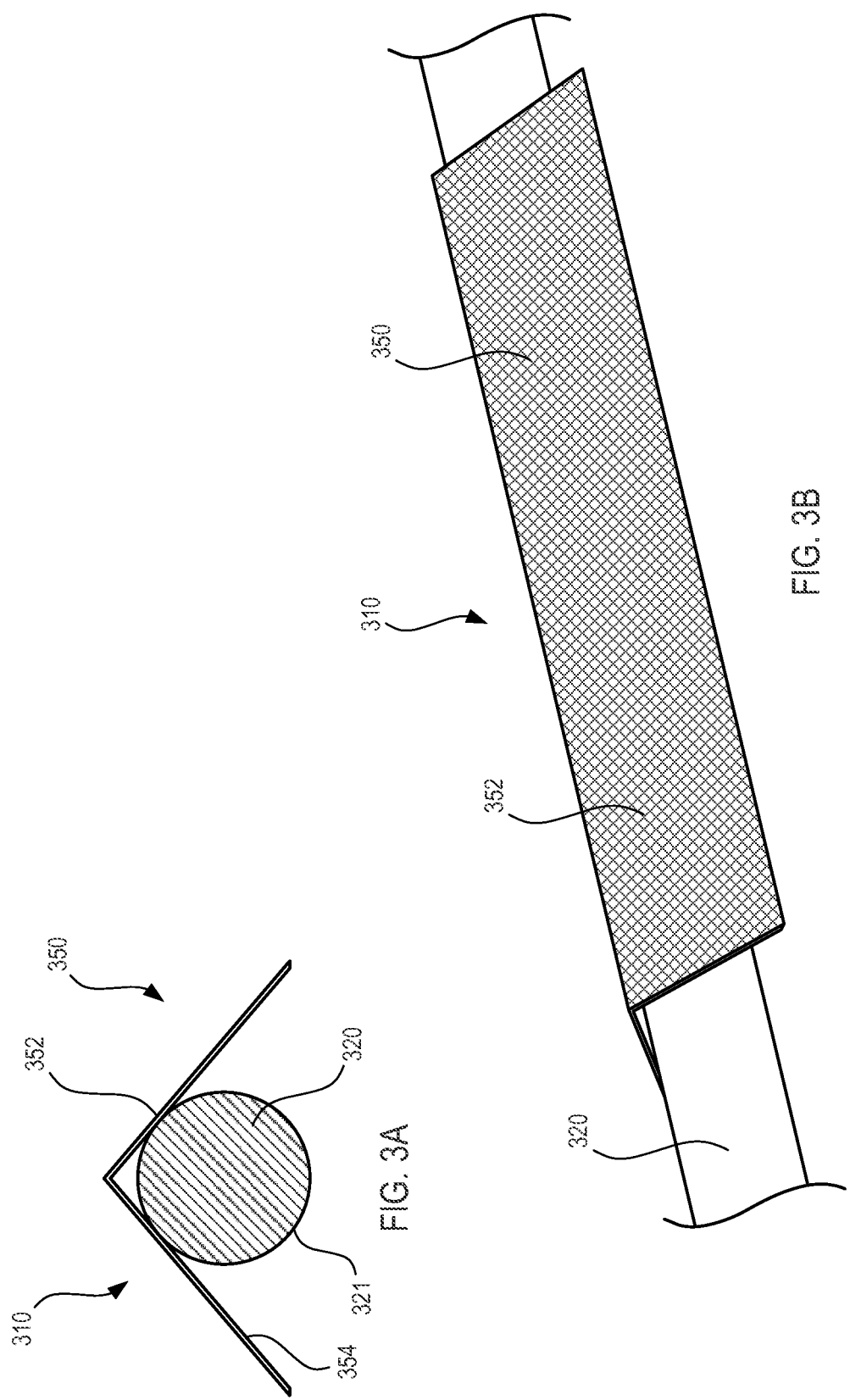

CAMOUFLAGE FOR TRANSMISSION TOWERS AND LINES

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications, or claims benefits under 35 U.S.C. §119(e) for provisional patent applications, for any and all parent, grandparent, great-grandparent, etc. applications of the Priority Application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This disclosure relates to camouflaged systems and related camouflaging methods. The camouflaged systems can include one or more camouflaged objects, including but not limited to transmission lines and transmission towers.

SUMMARY

The present disclosure relates to camouflaged systems and related camouflaging methods. As detailed below, the camouflaged systems can include at least one camouflaged object. Exemplary camouflaged objects include but are not limited to transmission lines and transmission towers.

One or more surfaces of the camouflaged object can be configured to appear like (e.g., match, mimic, simulate, correspond to, or otherwise blend with) an environmental condition, which can include any variety of background environmental landscapes. For example, one or more surfaces of the camouflaged object can be painted, coated, or imparted with a texture such that they reflect light in a way that corresponds to any particular environmental condition.

The characteristics of the reflectivity of the one or more surfaces can be varied as desired. Such characteristics of the reflectivity include but are not limited to color, reflective intensity (e.g., brightness), magnitude of reflection, polarization, reflective direction, angle of reflection, diffuse reflection, and specular reflection, etc. Configuring the reflectivity and/or the characteristics thereof to correspond to an environmental condition can reduce the ability of an observer to recognize the camouflaged object or distinguish the camouflaged object from the surrounding environmental landscape.

Further, the camouflaged object can be configured such that at least two surfaces appear like (e.g., match, mimic, simulate, correspond to, or otherwise blend with) at least two different environmental conditions. For example, the camouflaged object can include a first surface having a first reflectivity that corresponds to a first environmental condition, and a second surface having a second reflectivity that corresponds to a second environmental condition. In such instances, the appearance or reflectivity of the camouflaged object can be dependent upon the location of the observer. For example, the first surface having the first reflectivity can be observed from a first location, and the second surface having the second reflectivity can be observed from a second location. The ability to recognize the camouflaged object can thus be reduced, independent of the location and/or viewpoint of the observer and independent of changes in the environment.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 2A-2C depict a camouflaged object comprising a transmission line, according to another embodiment of the present disclosure.

FIGS. 3A-3B depict a camouflaged object comprising a reflector, according to another embodiment of the present disclosure.

DETAILED DESCRIPTION

Figure 1:
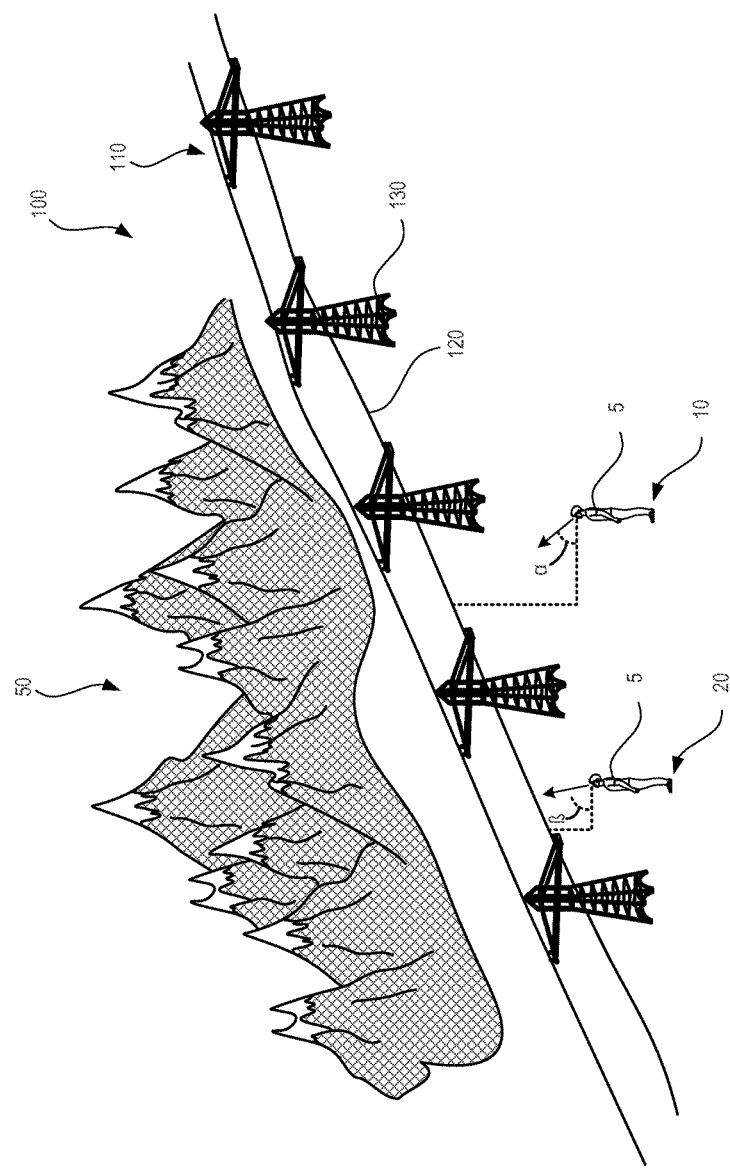
FIG. 1 depicts a camouflaged system, according to an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

The present disclosure relates to camouflaged systems and related camouflaging methods. As detailed below, the camouflaged systems can include at least one camouflaged object. Exemplary camouflaged objects include but are not limited to transmission lines and transmission towers.

One or more surfaces of the camouflaged object can be configured to appear like (e.g., match, mimic, simulate, correspond to, or otherwise blend with) an environmental condition, which can include any variety of background environmental landscapes. For example, one or more surfaces of the camouflaged object can be painted, coated, or imparted with a texture such that they reflect light in a way that corresponds to any particular environmental condition.

The characteristics of the reflectivity of the one or more surfaces can be varied as desired. Such characteristics of the reflectivity include but are not limited to color, reflective intensity (e.g., brightness), magnitude of reflection, polarization, reflective direction, angle of reflection, diffuse reflection, and specular reflection, etc. Configuring the reflectivity and/or the characteristics thereof to correspond to an environmental condition can reduce the ability of an observer to recognize the camouflaged object or distinguish the camouflaged object from the surrounding environmental landscape.

Further, the camouflaged object can be configured such that at least two surfaces appear like (e.g., match, mimic, simulate, correspond to, or otherwise blend with) at least two different environmental conditions. For example, the camouflaged object can include a first surface having a first reflectivity that corresponds to a first environmental condition, and a second surface having a second reflectivity that corresponds to a second environmental condition. In such instances, the appearance or reflectivity of the camouflaged object can be dependent upon the location of the observer. For example, the first surface having the first reflectivity can be observed from a first location, and the second surface having the second reflectivity can be observed from a second location. The ability to recognize the camouflaged object can thus be reduced, independent of the location and/or viewpoint of the observer and independent of changes in the environment.

FIG. 1 depicts a camouflaged transmission system 100, according to an embodiment of the disclosure. As shown in FIG. 1, the camouflaged transmission system 100 comprises at least one camouflaged object 110. The camouflaged object 110 can comprise various structures, including but not limited to a transmission line 120 and/or a transmission tower 130.

A transmission line 120 refers to any line that is configured to carry, transfer, or otherwise transmit a current or signal from one location to another. For example, in some embodiments, a transmission line 120 can be configured to carry an electrical current or electrical signal. In other embodiments, a transmission line 120 can be configured to carry light.

Various types of transmission lines 120 can be camouflaged according to the principles disclosed herein. For example, in some embodiments, the transmission line 120 comprises a wire, fiber, or cable. The transmission line 120 can also comprise various materials, including but not limited to metals (e.g., aluminum, steel, copper, gold, etc.), composite materials, plastics (e.g., plastic optical fiber), and glass (e.g., glass optical fiber). Exemplary transmission lines 120 include but are not limited to power lines, contact lines (e.g., contact lines for railways), and communications lines.

A transmission tower 130 refers to any structure that is configured to aid in carrying, transferring, or otherwise transmitting a current or signal from one location to another. For example, in some embodiments, a transmission tower 130 can support a transmission line 120. In other embodiments, a transmission tower 130 can be used in sending wireless signals. The transmission tower 130 can include various materials, including but not limited to metals (e.g., steel, aluminum, etc.), composite materials, wood, and concrete.

Various types of transmission towers 130 can be camouflaged according to the principles disclosed herein. For example, in some embodiments, the transmission tower 130 includes a pylon or other pillar-like structure. The transmission tower 130 can further include one or more cross-arms. The cross-arms can be coupled to the transmission line 120. In some embodiments, the transmission tower 130 comprises a lattice structure comprising a plurality of struts. The struts can be substantially linear (e.g., straight) or non-linear (e.g., curved). Exemplary transmission towers 130 include but are not limited to power line transmission towers, telephone transmission towers (e.g., telephone line towers, cell phone towers, etc.), railway transmission towers, internet transmission towers, and other types of data transmission towers.

The camouflaged object 110 can also comprise other objects and/or structures if desired. For example, the camouflaged object 110 can comprise various post or pole type structures, including but not limited to posts or poles used to support lights, traffic signals, signs, antennas, wind mills, etc. Non-post or non-pole type structures can also be camouflaged according to the principles disclosed herein. It will thus be appreciated that the camouflaging principles disclosed herein are not limited to any particular object and/or structure.

With continued reference to FIG. 1, in some embodiments, one or more surfaces of the camouflaged object 110 can be configured to reflect light such that the surface appears like (e.g., matches, mimics, simulates, corresponds to, or otherwise blends with) an environmental condition 50. In other words, one or more surfaces of the camouflaged object 110 can be configured to have a reflectivity that corresponds to a particular environmental condition 50. Configuring the reflectivity to correspond to an environmental condition 50 can reduce the ability of an observer 5 to recognize the camouflaged object 110 or distinguish the camouflaged object 110 from the environmental condition 50.

In certain embodiments, the environmental condition 50 can comprise the camouflaged object's 110 surroundings, or the surrounding environmental landscape. The surrounding environmental landscape can also be referred to as a background environmental landscape. Exemplary environmental landscapes include but are not limited to forested landscapes, wooded landscapes, mountainous landscapes, coastal landscapes, rocky landscapes, snowy landscapes, hilly landscapes, desert landscapes, plain landscapes, agricultural landscapes, sky landscapes, water landscapes, grassy landscapes, industrial landscapes (e.g., industrial buildings, refineries, etc.), commercial landscapes (e.g., commercial buildings, office buildings, etc.), and residential landscapes (e.g., residential homes, apartments buildings, etc.).

Various methods can be used to configure or otherwise impart the one or more surfaces of the camouflaged object 110 with a desired reflectivity. For example, in some embodiments, data or information about an environmental condition can be collected, obtained, and/or received. The data or information can include the location of the camouflaged object 110 and/or the one or more surfaces thereof, or the location where the camouflaged object 110 is to be employed. The data or information can further include the characteristics of the environmental condition(s) at and/or near the location of the camouflaged object 110 and/or the one or more surfaces thereof, including the characteristics of the environmental condition(s) that are observed when viewing the camouflaged object 110 and/or the one or more surfaces thereof from one or more observation locations or viewpoints.

A particular reflectivity can then be imparted to the one or more surfaces of the camouflaged object 110 by, for example, painting the one or more surfaces, coating the one or more surfaces, imparting a texture to the one or more surfaces, or combinations thereof. The resulting paint layer, coating layer, texture, and/or combination thereof can exhibit a reflectivity having characteristics that appear like (e.g., match, mimic, simulate, correspond to, or otherwise blend with) the data or information received about the environmental condition.

The reflectivity can be imparted to the one or more surfaces of the camouflaged object 110 at various times. For example, in some embodiments, the reflectivity is imparted during the manufacturing process of the camouflaged object 110. In other embodiments, the reflectivity is imparted after manufacturing the camouflaged object 110, but prior to delivery and/or installation of the camouflaged object 110 at the location where it is to be employed. In yet other embodiments, the reflectivity can be imparted during installation at the desired location. In yet other embodiments, the reflectivity is imparted after installation. Further, in some embodiments, robots can be used to impart the reflectivity to the one or more surfaces. For example, line walking robots can be used in embodiments wherein the camouflaged object 110 comprises a transmission line 120.

The characteristics of the reflectivity (i.e., the reflective properties) exhibited by the one or more surfaces can also be varied as desired to achieve any particular camouflaging property. Such characteristics of the reflectivity include but are not limited to color, reflective intensity (e.g., brightness), magnitude of reflection, polarization, reflective direction, angle of reflection, diffuse reflection, specular reflection, and combinations thereof. By varying the reflective properties, the one or more surfaces can be configured to correspond to any variety of background environmental conditions.

With continued reference to FIG. 1, in certain embodiments, the camouflaged object 110 can be configured such that at least two surfaces appear like (e.g., match, mimic, simulate, correspond to, or otherwise blend with) at least two different environmental conditions. For example, the camouflaged object 110 can comprise a first surface having a first reflectivity that corresponds to a first environmental condition 50, and a second surface having a second reflectivity that corresponds to a second environmental condition 50. In such embodiments, the reflectivity or appearance of the camouflaged object 110 can be dependent upon the location of the observer 5. For example, the first reflectivity can be observed from a first location 10 and the second reflectivity can be observed from a second location 20. The ability to recognize the camouflaged object 110 can thus be reduced when viewed from a plurality of locations (e.g., 10, 20) despite the presence of multiple and/or varied environmental conditions 50.

In some of such embodiments, the first environmental condition 50 can comprise the camouflaged object's 110 surroundings (e.g., a first background environmental landscape) that are observed when the camouflaged object 110 is viewed from a first location 10, and the second environmental condition 50 can comprise the camouflaged object's 110 surroundings (e.g., a second background environmental landscape) that are observed when the camouflaged object 110 is viewed from a second location 20. With specific reference to FIG. 1, for example, a first surface of the camouflaged object 110 can have a first reflectivity that corresponds to a first environmental condition 50 comprising a mountainous landscape, and a second surface of the camouflaged object 110 can have a second reflectivity that corresponds to a second environmental condition 50 comprising a sky landscape. When the observer 5 views the camouflaged object 110 from the first location 10 (e.g., a location at a distance that is away from the camouflaged object 110), the first surface may be the only substantially viewable surface such that the ability of the observer 5 to recognize the camouflaged object 110 and/or distinguish the camouflaged object 110 from the background mountainous landscape may be reduced. Further, when the observer 5 views the camouflaged object 110 from the second location 20 (e.g., a location closer to or beneath the camouflaged object 110), the second surface may be the only substantially viewable surface such that the ability of the observer 5 to recognize the camouflaged object 110 and/or distinguish the camouflaged object 110 from the background sky landscape may also be reduced.

As further shown in FIG. 1, the one or more surfaces of the camouflaged object 110 can be configured to correspond to different environmental conditions 50 depending upon the direction and/or angle at which the camouflaged object 110 is viewed. For example, the angular measurement between the first location 10 and the camouflaged object 110 can comprise a first angle $\alpha$, which can also be described as a first azimuth, and the angular measurement between the second location 20 and the camouflaged object 110 can comprise a second angle $\beta$, which can be described as a second azimuth. When viewing the camouflaged object 110 from the first angle $\alpha$, the first surface may be the only substantially viewable surface such that the ability of the observer 5 to recognize the camouflaged object 110 and/or distinguish the camouflaged object 110 from the first environmental landscape may be reduced. Similarly, when viewing the camouflaged object 110 from the second angle $\beta$, the second surface may be the only substantially viewable surface such that the ability of the observer 5 to recognize the camouflaged object 110 and/or distinguish the camouflaged object 110 from the second environmental landscape may be reduced.

As further detailed below, in some embodiments, one or more surfaces of the camouflaged object 110 can extend along a direction and can further include one or more additional reflectivities that correspond to one or more additional environmental conditions. In such embodiments, the reflectivities of the first surface can change along the first direction so as to correspond to changes between the environmental conditions. For example, a first portion of a first surface can have a first reflectivity that corresponds to a first environmental condition, and a second portion of the first surface can have a second reflectivity that corresponds to a second environmental condition.

FIGS. 2A-2C depict a camouflaged object 210 comprising a transmission line 220. As shown in FIGS. 2A-2C, the transmission line 220 can comprise a plurality of surfaces (or surface regions) 222, 224, 226, 228, each of which can be configured to exhibit a particular reflectivity 223, 225, 227, 229. For example, the transmission line 220 in the illustrated embodiment comprises a first surface 222 having a first reflectivity 223, a second surface 224 having a second reflectivity 225, a third surface 226 having a third reflectivity 227, and a fourth surface 228 having a fourth reflectivity 229. The transmission line 220 can also be configured with more or fewer surfaces (or surface regions) having particular reflectivities as desired.

As previously discussed, the reflectivity 223, 225, 227, 229 of each of the surfaces (or surface regions) 222, 224, 226, 228 can be configured to correspond to a particular environmental condition. For example, the first reflectivity 223 can correspond to a first environmental condition, the second reflectivity 225 can correspond to a second environmental condition, the third reflectivity 227 can correspond to a third environmental condition, and the fourth reflectivity 229 can correspond to a fourth environmental condition. In such embodiments, the transmission line 220 can appear different when viewed from different viewpoints, observation locations, angles, and directions, etc. For example, as shown in FIG. 2B, when an observer views the transmission line 220 from the direction of $D_1$, the first surface 222 having the first reflectivity 223 may be the only substantially viewable surface. Analogously, when an observer views the transmission line 220 from the direction of $D_2$, as shown in FIG. 2C, the second surface 224 having the second reflectivity 225 may be the only substantially viewable surface.

As can be appreciated, any variation of the above-identified methods of imparting reflectivity can be applied to each surface (or surface region) 222, 224, 226, 228 of the transmission line 220. For example, the first surface 222 can comprise at least one of a paint layer, a coating, and a texture having the first reflectivity 223. Analogously, the second, third, and fourth surfaces 224, 226, 228 can each comprise at least one of a paint layer, a coating, and a texture having the second, third, and fourth reflectivities 225, 227, 229, respectively. For example, in certain embodiments, the first surface 222 comprises a first paint layer having the first reflectivity 223, and the second surface 224 comprises a second paint layer having the second reflectivity 225. In other embodiments, the first surface 222 comprises a first coating having the first reflectivity 223, and the second surface 224 comprises a second coating having the second reflectivity 225. In yet other embodiments, the first surface 222 comprises a first texture having the first reflectivity 223, and the second surface 224 comprises a second texture having the second reflectivity 225.

Combinations of the above-identified methods of imparting reflectivity can also be applied to the surfaces (or surface regions) 222, 224, 226, 228. For example, in certain of such embodiments, the first surface 222 can comprise a paint layer having the first reflectivity 223, and the second surface 224 can comprise a coating having the second reflectivity 225. In other embodiments, the first surface 222 can comprise a paint layer having the first reflectivity 223, and the second surface 224 can comprise a texture having the second reflectivity 225. In yet other embodiments, the first surface 222 can comprise a coating having the first reflectivity 223, and the second surface 224 can comprise a texture having the second reflectivity 225.

In further embodiments, one or more of the surfaces (or surface regions) 222, 224, 226, 228 can exhibit a reflectivity 223, 225, 227, 229 that comprises the default appearance of the surface 222, 224, 226, 228. For example, the surface (or surface region) 222, 224, 226, 228 can exhibit a reflectivity 223, 225, 227, 229 that is imparted during the normal course of manufacturing. In such embodiments, the surface (or surface region) 222, 224, 226, 228 need not be further painted, coated, or imparted with additional texture after the manufacturing process.

As can be appreciated, the characteristics of the first, second, third, and/or fourth reflectivities 223, 225, 227, 229 can be configured to correspond to any particular environmental condition. Such characteristics include but are not limited to color, reflective intensity, (e.g., brightness), magnitude of reflection, polarization, reflective direction, angle of reflection, diffuse reflection, specular reflection, and combinations thereof. The characteristics of the reflectivities 223, 225, 227, 229 can also be different from one another. For example, in certain embodiments, the first reflectivity 223 comprises a first color and the second reflectivity 225 comprises a second color. In further embodiments, the first reflectivity 223 comprises a first reflective intensity and the second reflectivity 225 comprises a second reflective intensity. In yet further embodiments, the first reflectivity 223 comprises a first magnitude of reflection, and the second reflectivity 225 comprises a second magnitude of reflection. In other embodiments, the first reflectivity 223 comprises a first polarization, and the second reflectivity 225 comprises a second polarization. In still other embodiments, the first reflectivity 223 comprises a first reflective direction, and the second reflectivity 225 comprises a second reflective direction. In still further embodiments, the first reflectivity 223 comprises a first angle of reflection and the second reflectivity 225 comprises a second angle of reflection. In other embodiments, the first reflectivity 223 comprises a first diffuse reflection, and the second reflectivity 225 comprises a second diffuse direction. In yet other embodiments, the first reflectivity 223 comprises a first specular reflection, and the second reflectivity 225 comprises a second specular reflection. Combinations of the above-mentioned characteristics are also contemplated.

In certain embodiments, one or more surfaces 222, 224, 226, 228 can also be configured to enhance visualization of the camouflaged object 210. For example, a surface or surface region 222, 224, 226, 228 (e.g., a top surface or surface region) can be imparted with a reflectivity 223, 225, 227, 229 that is easily seen or otherwise recognizable by a person, e.g., such as a pilot of an airplane, helicopter, para glider, hang glider, or other form of aircraft. A surface or surface region 222, 224, 226, 228 (e.g., a top surface or surface region) can also be imparted with a reflectivity 223, 225, 227, 229 that is easily seen or otherwise recognizable by animals such as birds.

It will also be appreciated that the surfaces (or surfaces regions) 222, 224, 226, 228 can be defined in various ways. For example, a surface or surface region 222, 224, 226, 228 can extend around as much or as little of the camouflaged object 210 as desired. The spatial relationship of the reflective surfaces 222, 224, 226, 228 can also be varied as desired. For example, with specific reference to FIG. 2A, in some embodiments, a first surface (or surface region) 222 can comprise a side surface of the transmission line 220, and a second surface (or surface region) 224 can comprise a bottom surface of the transmission line 220. In other embodiments, a first surface 222 can comprise the top surface of the transmission line 220, and a second surface 224 can comprise the bottom surface of the transmission line 220. In yet other embodiments, a first surface 222 can comprise one surface (e.g., a first side surface) of the transmission line 220, and a second surface 224 can comprise an opposite surface (e.g., a second side surface) of the transmission line 220. The first surface (or surface region) 222 of the transmission line 220 can also be described as comprising a first azimuthal region, and the second surface (or surface region) 224 of the transmission line 220 can be described as comprising a second azimuthal region.

FIGS. 3A-3B depict a camouflaged object 310 comprising a reflector 350, according to another embodiment of the disclosure. As shown in FIGS. 3A-3B, one or more reflectors 350 can be disposed on or otherwise coupled to the camouflaged object 310. For example, as shown in the illustrated embodiment, a reflector 350 can be coupled to a transmission line 320. In other embodiments, one or more reflectors 350 can be coupled to a transmission tower or another camouflaged object or structure.

Various types of reflectors 350 can be used. For example, in the illustrated embodiment, the reflector 350 comprises an inverted v-shaped reflector. Other types (e.g., shapes and/or sizes) of reflectors 350 can also be used as desired.

The one or more reflectors 350 can be configured to impart one or more reflective characteristics to the camouflaged object 310. For example, in some embodiments, at least one reflective surface that is observed when viewing the camouflaged object 310 can comprise a surface 352 of the reflector 350. In such embodiments, at least one surface of the camouflaged object 310 can be described as being disposed on the reflector 350.

As can be appreciated, the reflector 350 can be configured to reflect an image of an environmental condition (e.g., the surrounding environmental landscape). For example, a first surface 352 of the reflector 350 can be configured to reflect the sky or an image thereof. Other background environmental landscapes can also be reflected by the reflector 350. Further, in some embodiments, a second surface 354 of the reflector 350 can be painted or otherwise coated to correspond to a second environmental condition. For example, in the illustrated embodiment, a bottom surface 354 of the reflector 350 can be configured to correspond to a sky landscape such that the reflector 350 is not readily apparent when being viewed from a location that is substantially beneath the camouflaged object 310. In some of such embodiments, a surface 321 of the camouflaged object 310 can also be configured to correspond to the second environmental condition (e.g., sky landscape), thereby reducing the ability of an observer to recognize and/or distinguish both the surface 321 of the camouflaged object 310 and the reflector 350.

Figure 4:
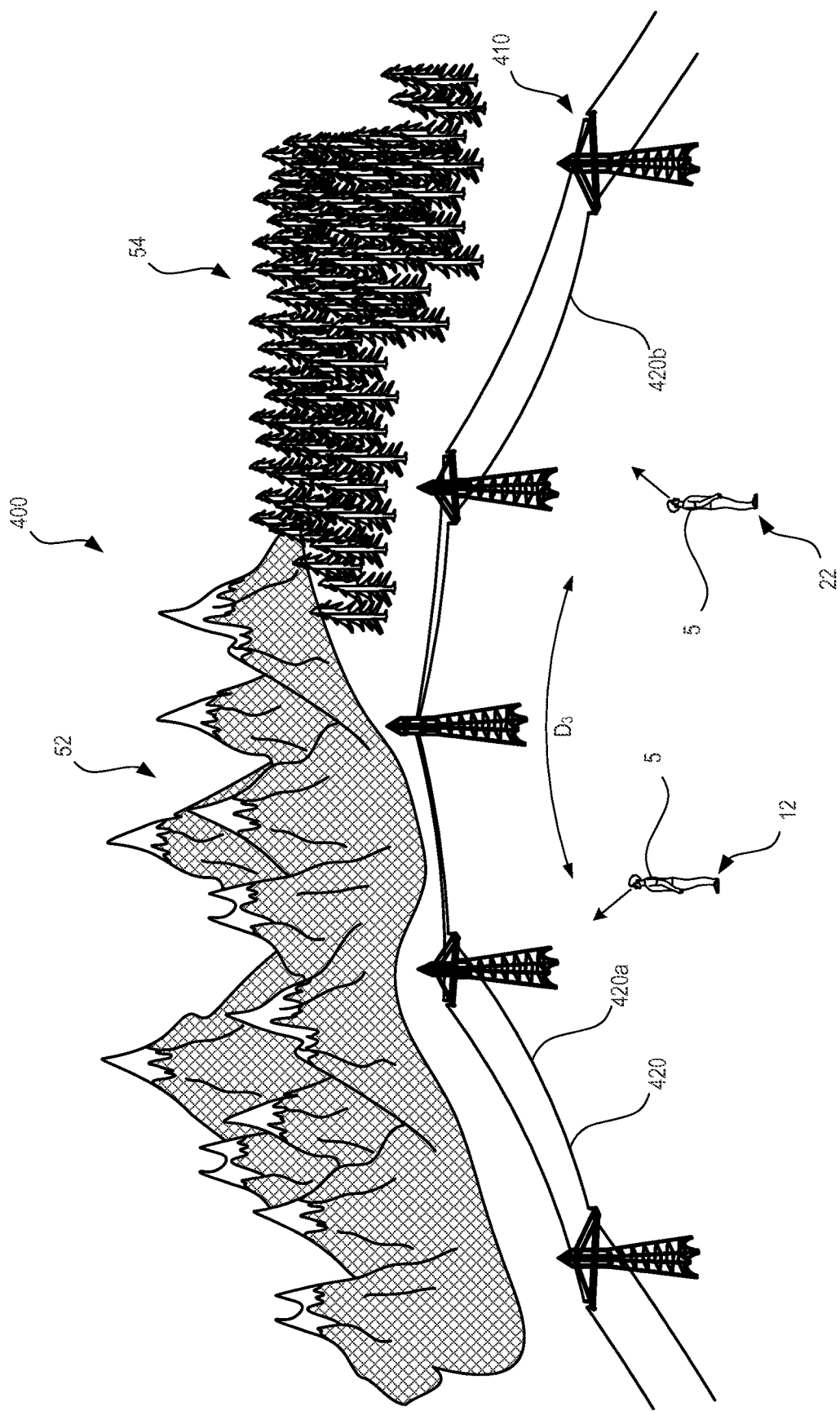
FIG. 4 depicts a camouflaged system, according to another embodiment of the present disclosure.

FIG. 4 depicts a camouflaged transmission system 400, according to another embodiment of the disclosure. As shown in FIG. 4, in some embodiments, the camouflaged object 410 comprises a transmission line 420 that extends along a first direction $D_3$ (e.g., a longitudinal direction of the transmission line 420). As the transmission line 420 extends along the first direction $D_3$, the reflectivity or reflective properties of the transmission line 420 can change to correspond to changes in one or more environmental conditions. For example, a first portion of one or more surfaces of the transmission line 420 can have a first reflectivity that corresponds to a first environmental condition 52, and a second portion of the one or more surfaces of the transmission line 420 can have a second reflectivity that corresponds to a second environmental condition 54.

With specific reference to FIG. 4, for example, a first portion 420a of one or more surfaces of the transmission line 420 can have a first reflectivity that corresponds to a first environmental condition 52 (e.g., a mountainous landscape), and a second portion 420b of one or more surfaces of the transmission line 420 can have a second reflectivity that corresponds to a second environmental condition 54 (e.g., a forested landscape). In such embodiments, the transmission line 420 can appear different when an observer 5 views the transmission line 420 from a first location 12 and a second location 22. For example, a first portion 420a of the transmission line 420 can appear like a mountainous landscape, and a second portion 420b of the transmission line 420 can appear like a forested landscape, thereby reducing the ability of the observer 5 to recognize the camouflaged object 410 from various observation locations, independent of changes in the environment. As can be appreciated, the transmission line 420 can also appear different when an observer 5 views the transmission line 420 from one location, but from different directions and/or angles (e.g., if the observer 5 at the first location 12 turns towards the second environmental condition 54).

Figure 5:
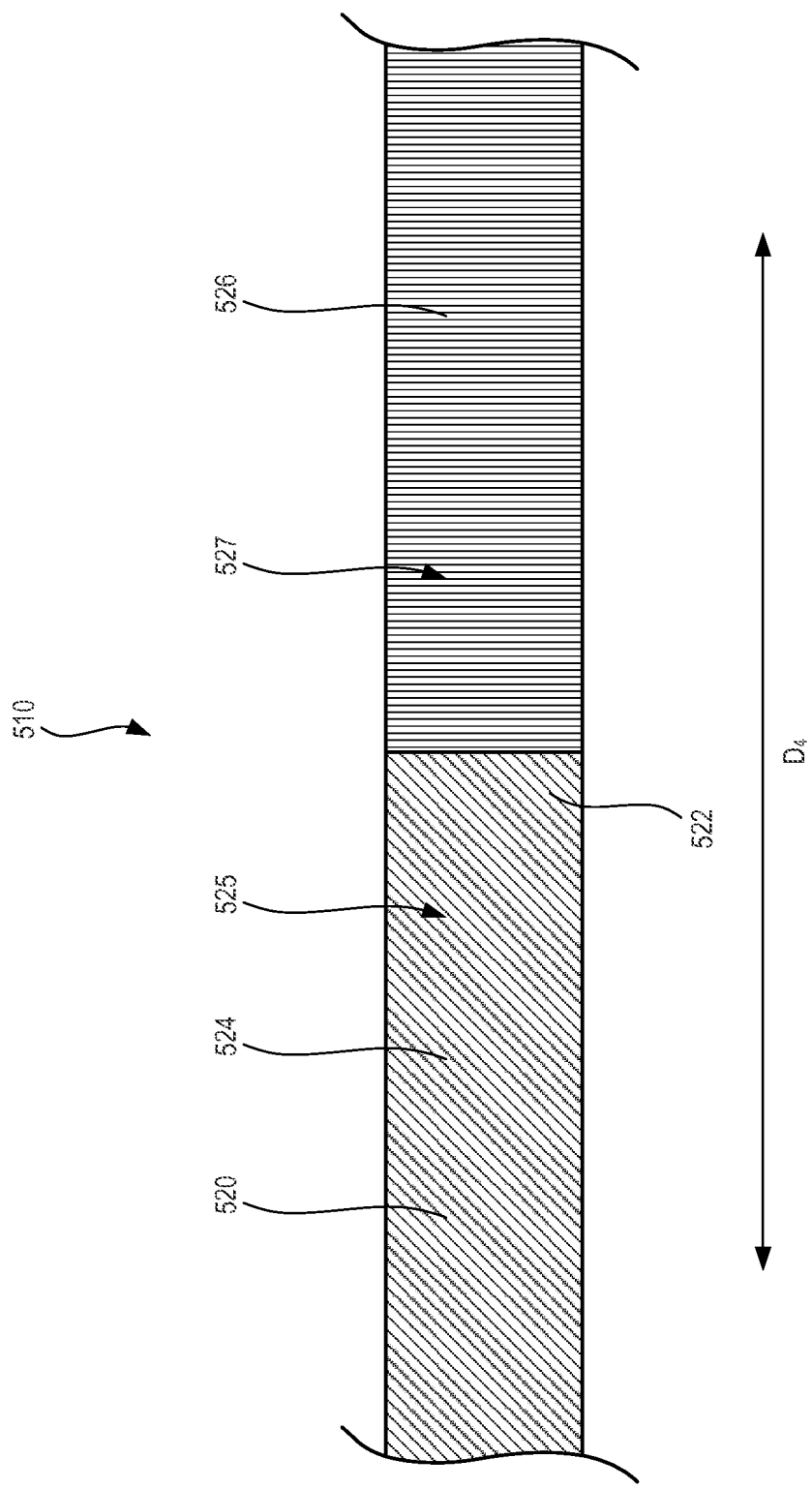
FIG. 5 depicts a camouflaged object comprising a transmission line, according to another embodiment of the present disclosure.

FIG. 5 depicts a camouflaged object 510 comprising a transmission line 520 having a surface 522 that extends along a first direction $D_4$ (e.g., a longitudinal direction). As shown in FIG. 5, the reflectivity 525, 527 varies as the transmission line 520 extends in the first direction $D_4$. For example, a first portion 524 of the surface 522 has a first reflectivity 525, and a second portion 526 of the surface 522 has a second reflectivity 527. As discussed above with respect to FIG. 4, the first reflectivity 525 can correspond to a first environmental condition, and the second reflectivity 527 can correspond to a second environmental condition.

Figures 6A, 6B:
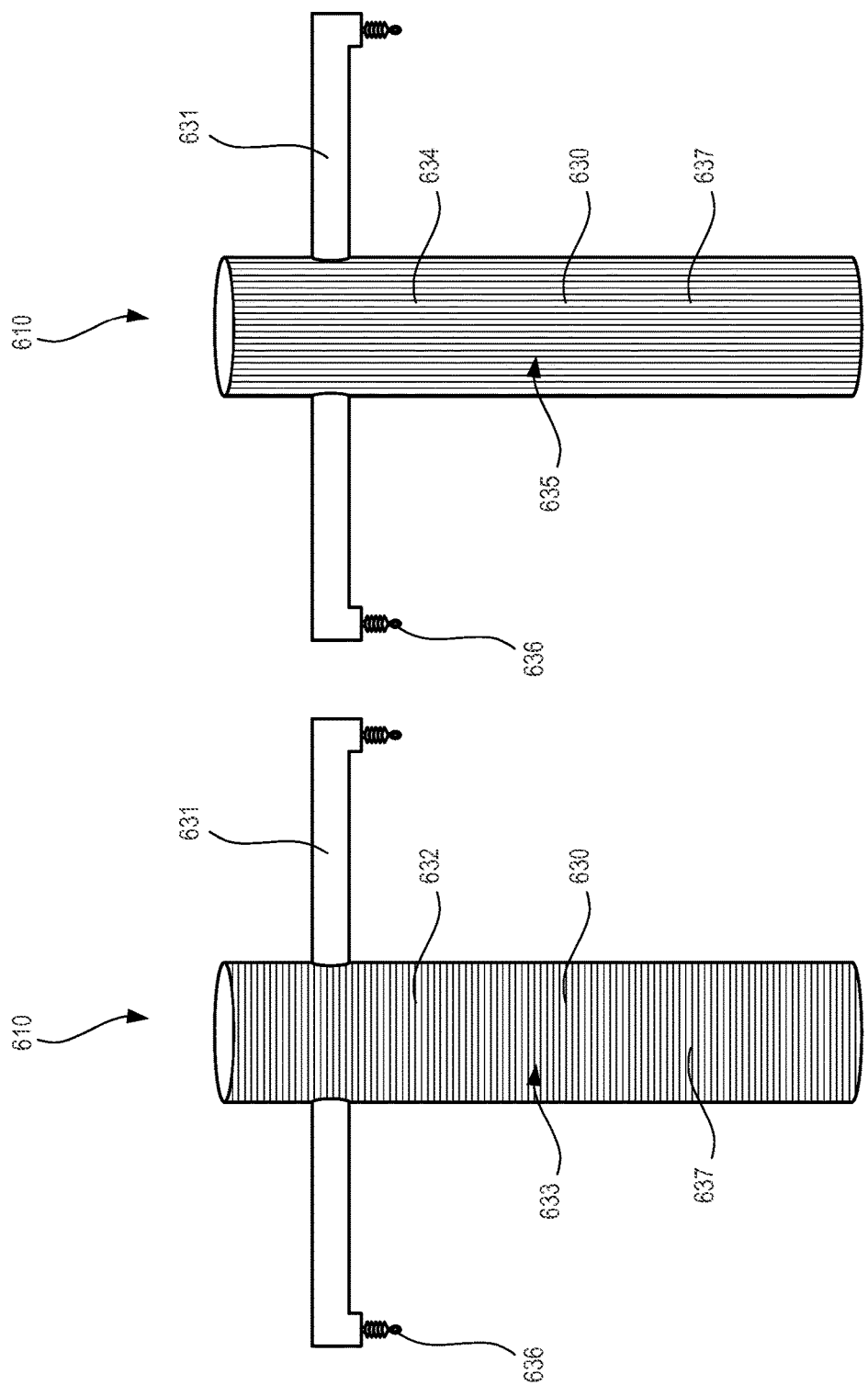
FIGS. 6A-6B depict a camouflaged object comprising a transmission tower, according to another embodiment of the present disclosure.

FIGS. 6A-6B depict a camouflaged object 610 comprising a transmission tower 630. As shown in FIGS. 6A-6B, the transmission tower 630 can comprise one or more surfaces 632, 634 that are configured to have a reflectivity 633, 635 that corresponds to a particular environmental condition. For example, in the illustrated embodiment, the transmission tower 630 comprises a first surface 632 having a first reflectivity 633 that can correspond to a first environmental condition, and a second surface 634 having a second reflectivity 635 that can correspond to a second environmental condition.

In some embodiments, the first surface 632 is disposed on a first side of the transmission tower 630 (as shown in FIG. 6A), and the second surface 634 is disposed on a second side of the transmission tower 630 (as shown in FIG. 6B). Further, the first and second sides are disposed on opposite sides of the transmission tower 630. For example, FIG. 6B depicts the transmission tower 630 of FIG. 6A rotated 180 degrees, and vice versa. The first and second surfaces 632, 634 can also be disposed on the transmission tower 630 in any other manner as desired, e.g., a bottom surface and a top surface.

As further shown in FIGS. 6A-6B, in some embodiments, the transmission tower 630 comprises a pylon or pillar-like structure 637. If desired, the transmission tower 630 can further comprise one or more cross-arms 631, which can extend outwardly from the transmission tower 630. The cross-arms 631 can include coupling members 636 and can be configured to couple to one or more transmission lines. In some of such embodiments, the cross-arms 631 can also comprise one or more surfaces that are configured to correspond to an environmental condition, analogous to the first and second surfaces 632, 634 previously discussed.

Figure 7:
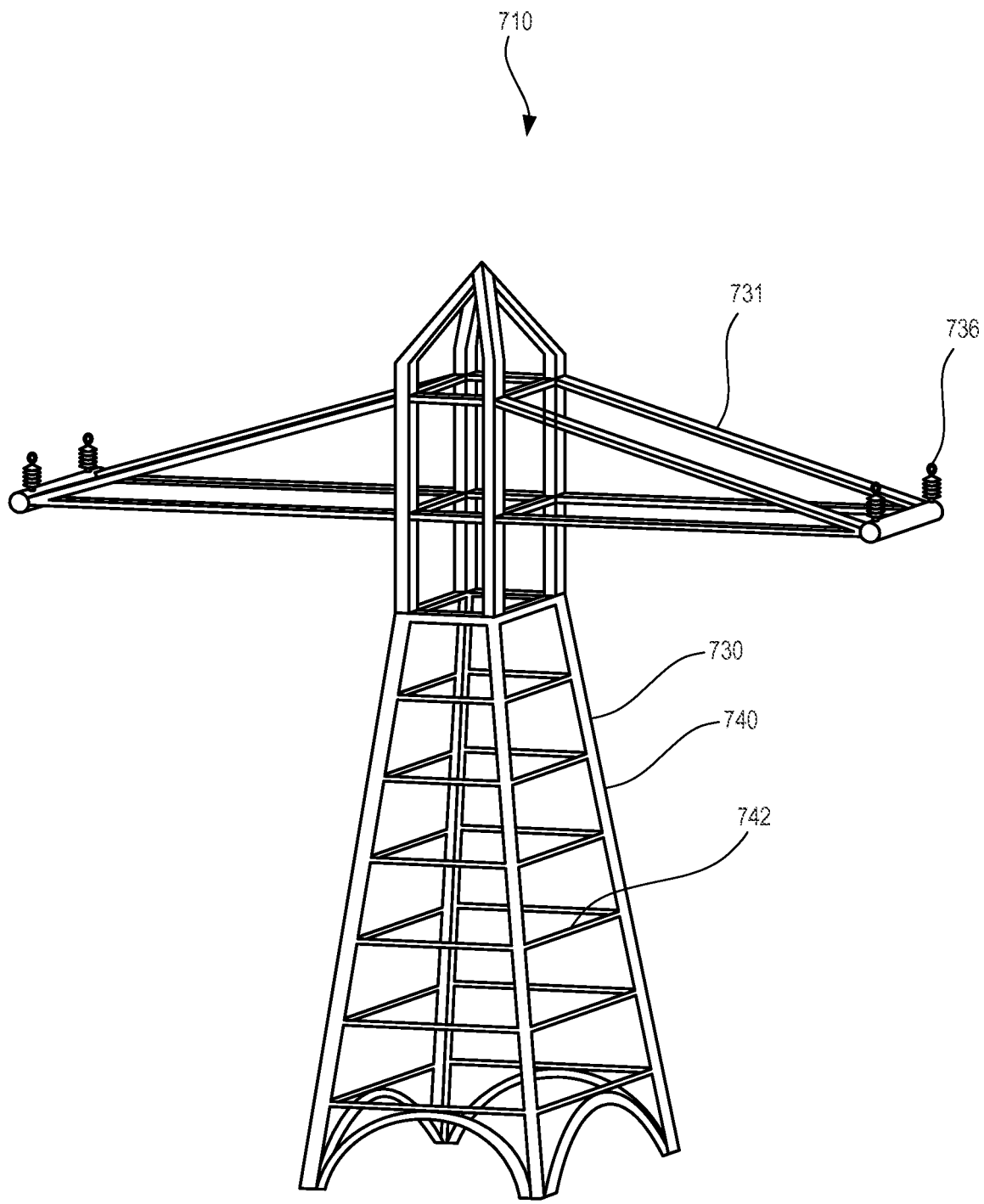
FIG. 7 depicts a camouflaged object comprising a transmission tower, according to another embodiment of the present disclosure.
Figure 8B:
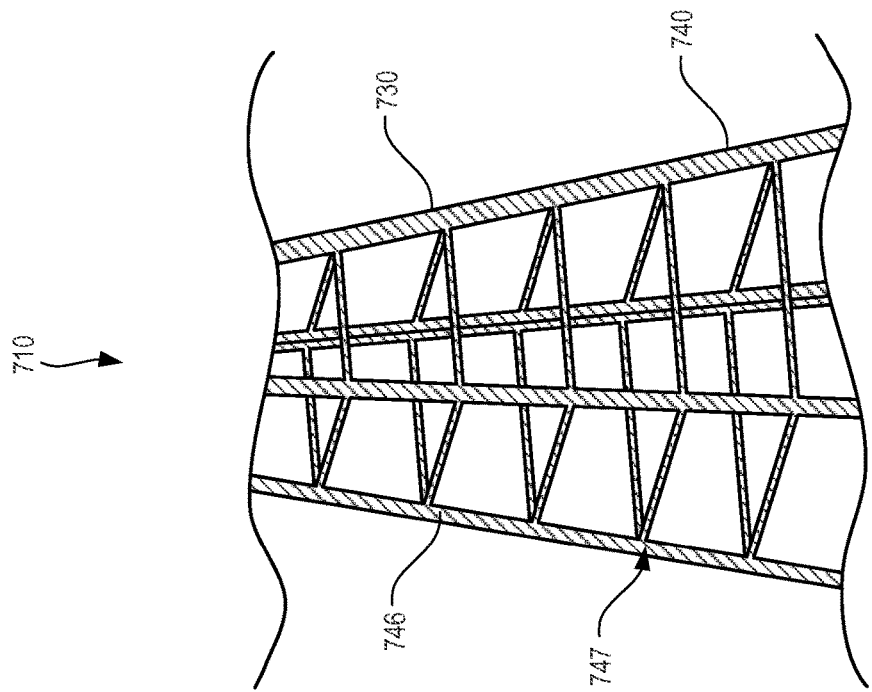
FIGS. 8A-8B depict a camouflaged object comprising a transmission tower, according to another embodiment of the present disclosure.
Figure 8A:
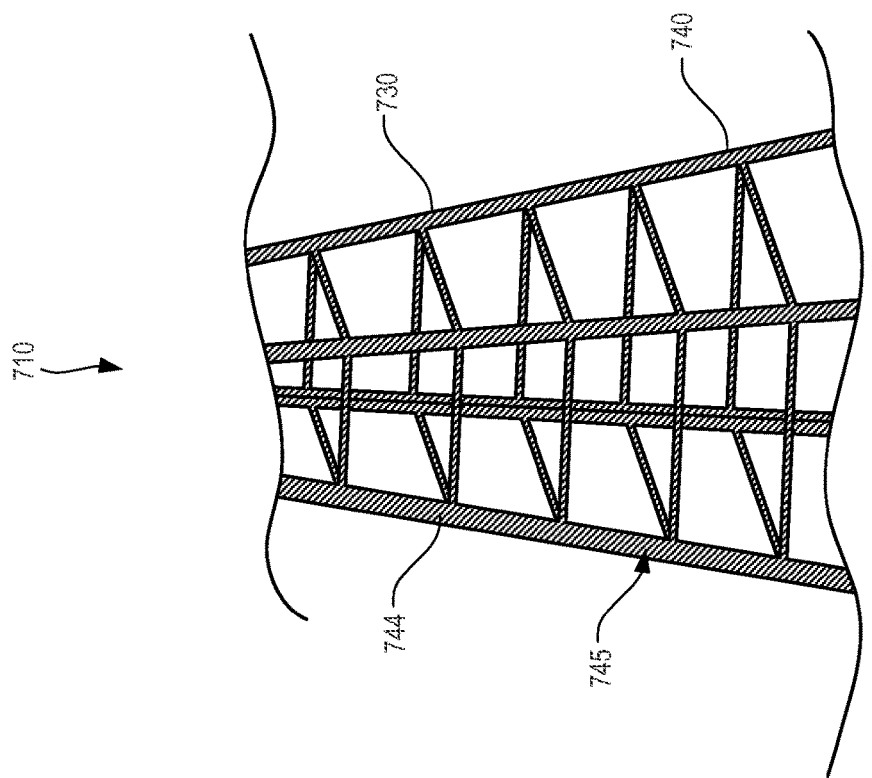

FIGS. 7 and 8A-8B depict a camouflaged object 710 comprising a transmission tower 730, according to another embodiment of the disclosure. In the illustrated embodiment, the transmission tower 730 comprises a lattice structure 740. The lattice structure 740 comprises a plurality of struts 742, which can be substantially linear (as shown in the illustrated embodiment), or non-linear (e.g., curved). The transmission tower 730 further comprises one or more cross-arms 731, which can extend outwardly from the transmission tower 730 and can include one or more coupling members 736 for coupling one or more transmission lines. As previously mentioned, wireless transmission towers 730 can also be used.

It will also be appreciated that any surface (e.g., any viewable surface) of the transmission tower 730 can be camouflaged according to the principles disclosed herein. With specific reference to FIGS. 8A-8B, for example, the transmission tower 730 can comprise a first surface 744 having a first reflectivity 745 that corresponds to a first environmental condition, and a second surface 746 having a second reflectivity 747 that corresponds to a second environmental condition. The first surface 744 can be disposed on a first side of the transmission tower 730, and the second surface 746 can be disposed on a second side of the transmission tower 730. In certain embodiments, the first and second surfaces 744, 746 are disposed on opposite sides of the transmission tower 730 (as shown in FIGS. 8A-8B, which represent views of the transmission tower 730 rotated 180 degrees from one another). In other embodiments, the first and second surfaces 744, 746 can be disposed on adjacent sides of the transmission tower 730.

With further reference to FIGS. 8A-8B, when viewed from a first location, as shown in FIG. 8A, the first surface 744 having a first reflectivity 745 may be the only substantially viewable surface of the transmission tower 730. Analogously, when viewed from a second location, as shown in FIG. 8B, the second surface 746 having a second reflectivity 747 may be the only substantially viewable surface of the transmission tower 730.

Methods for camouflaging an object are also provided herein. In particular, it is contemplated that any of the components, principles, and/or embodiments discussed above may be utilized by either a system or a method. For example, in an embodiment, a method for camouflaging an object can comprise imparting a first reflectivity to a first surface of the object, the first reflectivity corresponding to a first environmental condition. The method can further comprise a step of imparting a second reflectivity to a second surface of the object, the second reflectivity corresponding to a second environmental condition.

In some embodiments, the method further comprises a step of receiving data corresponding to at least one of the first and second environmental conditions. The data can comprise a location of at least one of the first surface and the second surface. The method can further comprise providing the camouflaged object to a third party. Additional steps, and/or methods, can also be employed.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A camouflaged transmission system, comprising:
 a transmission line, the transmission line comprising:
  a first surface having a first color that covers the entirety of the first surface, wherein the first color corresponds to a first environmental condition, wherein the first environmental condition comprises the transmission line's surroundings when the transmission line is viewed from a first location; and
  a second surface having a second color that covers the entirety of the second surface, wherein the second color corresponds to a second environmental condition that differs from the first environmental condition, wherein the second environmental condition comprises the transmission line's surroundings when the transmission line is viewed from a second location;
  wherein the first surface is the only substantially viewable surface from the first location, and wherein the second surface is the only substantially viewable surface from the second location.

2. The system of claim 1, wherein the transmission line comprises a wire, fiber, or cable.

3. The system of claim 1, wherein the first surface comprises a side surface of the transmission line and the second surface comprises a bottom surface of the transmission line.

4. The system of claim 1, wherein the first environmental condition comprises a first background environmental landscape, and the second environmental condition comprises a second background environmental landscape.

5. The system of claim 4, wherein each of the first and second background environmental landscapes comprises at least one of the following: a forested landscape, a wooded landscape, a mountainous landscape, a coastal landscape, a rocky landscape, a snowy landscape, a hilly landscape, a desert landscape, a plain landscape, an agricultural landscape, a sky landscape, a water landscape, a grassy landscape, an industrial landscape, a commercial landscape, and a residential landscape.

6. The system of claim 4, wherein the first color is configured to mimic the first background environmental landscape, and the second color is configured to mimic the second background environmental landscape.

7. The system of claim 4, wherein the first color is configured to simulate the first background environmental landscape, and the second color is configured to simulate the second background environmental landscape.

8. The system of claim 4, wherein the first color is configured to blend with the first background environmental landscape, and the second color is configured to blend with the second background environmental landscape.

9. The system of claim 4, wherein the first color corresponds with the first background environmental landscape so as to reduce an ability to recognize the transmission line when viewed from the first location, and the second color corresponds with the second background environmental landscape so as to reduce an ability to recognize the transmission line when viewed from the second location.

10. The system of claim 1, wherein the first surface comprises at least one of a paint layer or a coating having the first color.

11. The system of claim 1, wherein the transmission line further comprises a third surface having a third color that is recognizable by a person or animal, wherein the third surface comprises a top surface of the transmission line.

12. A camouflaged transmission system, comprising:
a transmission line, the transmission line comprising:
a first surface having a first color that corresponds to a first environmental condition, wherein the first environmental condition comprises the transmission line's surroundings when the transmission line is viewed from a first location;
a second surface having a second color that corresponds to a second environmental condition that differs from the first environmental condition, wherein the second environmental condition comprises the transmission line's surroundings when the transmission line is viewed from a second location; and
a third surface having a third color, wherein the third color is recognizable by a person or an animal, wherein the third surface comprises a top surface of the transmission line.

13. The system of claim 12, wherein the transmission line comprises a wire, fiber, or cable.

14. The system of claim 12, wherein the first environmental condition comprises a first background environmental landscape and the second environmental condition comprises a second background environmental landscape.

15. The system of claim 14, wherein each of the first and second background environmental landscapes comprises at least one of the following: a forested landscape, a wooded landscape, a mountainous landscape, a coastal landscape, a rocky landscape, a snowy landscape, a hilly landscape, a desert landscape, a plain landscape, an agricultural landscape, a sky landscape, a water landscape, a grassy landscape, an industrial landscape, a commercial landscape, and a residential landscape.

16. A method for camouflaging an object, the object comprising a transmission line, comprising:
imparting a first color to a first surface of the transmission line such that the first color covers the entirety of the first surface, the first color corresponding to a first environmental condition, wherein the first environmental condition comprises the transmission line's surroundings when the transmission line is viewed from a first location; and
imparting a second color to a second surface of the transmission line such that the second color covers the entirety of the second surface, the second color corresponding to a second environmental condition that differs from the first environmental condition, wherein the second environmental condition comprises the transmission line's surroundings when the transmission line is viewed from a second location;
wherein the first surface is the only substantially viewable surface from the first location, and wherein the second surface is the only substantially viewable surface from the second location.

17. The method of claim 16, wherein the transmission line comprises a wire, fiber, or cable.

18. The method of claim 16, wherein the first surface comprises a side surface of the transmission line and the second surface comprises a bottom surface of the transmission line.

19. The method of claim 16, wherein the first environmental condition comprises a first background environmental landscape, and the second environmental condition comprises a second background environmental landscape.

20. The method of claim 19, wherein each of the first and second background environmental landscapes comprises at least one of the following: a forested landscape, a wooded landscape, a mountainous landscape, a coastal landscape, a rocky landscape, a snowy landscape, a hilly landscape, a desert landscape, a plain landscape, an agricultural landscape, a sky landscape, a water landscape, a grassy landscape, an industrial landscape, a commercial landscape, and a residential landscape.

21. The method of claim 19, wherein the first color is configured to mimic the first background environmental landscape, and the second color is configured to mimic the second background environmental landscape.

22. The method of claim 19, wherein the first color is configured to simulate the first background environmental landscape, and the second color is configured to simulate the second background environmental landscape.

23. The method of claim 19, wherein the first color is configured to blend with the first background environmental landscape, and the second color is configured to blend with the second background environmental landscape.

24. The method of claim 19, wherein the first color corresponds with the first background environmental landscape so as to reduce an ability to recognize the object when viewed from the first location, and the second color corresponds with the second background environmental landscape so as to reduce an ability to recognize the object when viewed from the second location.

25. The method of claim 16, wherein the first color is imparted by a first paint layer or a first coating having the first color.

26. The system of claim 12, wherein the first color covers the entirety of the first surface, and wherein the second color covers the entirety of the second surface.

27. The system of claim 12, wherein the first surface comprises a side surface of the transmission line, and wherein the second surface comprises a bottom surface of the transmission line.

* * * * *